United States Patent [19]

Fiala

[11] 3,764,160
[45] Oct. 9, 1973

[54] INJURY PREVENTION DEVICE FOR VEHICLES

[75] Inventor: Ernst Fiala, Berlin, Germany

[73] Assignee: Wolf-Dieter Klink, Lindbach, Danziger Weg, Germany

[22] Filed: Oct. 26, 1970

[21] Appl. No.: 84,054

[30] Foreign Application Priority Data
Oct. 24, 1969 Germany.................. P 19 54 398.7

[52] U.S. Cl............................ 280/150 AB, 180/103
[51] Int. Cl. ........................................... B60r 21/06
[58] Field of Search................. 280/150 B, 150 AB; 296/84 K; 267/153, 145; 180/103

[56] References Cited
UNITED STATES PATENTS

| | | | |
|---|---|---|---|
| 3,588,142 | 6/1971 | Gorman........................ | 280/150 AB |
| 3,309,109 | 3/1967 | Baughman.................... | 280/150 B |
| 3,042,137 | 7/1962 | Mathues et al................. | 280/150 B |
| 3,514,124 | 5/1970 | Richardson................... | 280/150 AB |
| 2,755,125 | 7/1956 | Hodges......................... | 280/150 AB |
| 2,855,216 | 10/1958 | Sacks ............................ | 280/150 B |
| 3,539,200 | 11/1970 | Chute............................ | 280/150 AB |
| 3,632,136 | 1/1972 | Foltz............................. | 280/150 AB |
| 3,224,924 | 12/1965 | Von Ardenne et al. ........ | 280/150 B |
| 2,826,244 | 3/1958 | Hurley........................... | 267/145 |
| 2,892,489 | 6/1959 | Hurley........................... | 267/145 |

FOREIGN PATENTS OR APPLICATIONS

| | | | |
|---|---|---|---|
| 896,312 | 11/1953 | Germany...................... | 280/150 AB |

*Primary Examiner*—Kenneth H. Betts
*Attorney*—Curt M. Avery, Arthur E. Wilfond, Herbert L. Lerner and Daniel J. Tick

[57] ABSTRACT

An injury prevention device for vehicles, such as automobiles, trucks and the like, comprises a container, an inflatable pad including inflatable padding material maintained in a normally compressed condition inside the container under constant high pressure and actuating means being tripped responsive to the motion of the vehicle and rapidly inflating the pad to prevent a person from contacting hard surfaces within the vehicle.

12 Claims, 6 Drawing Figures

INJURY PREVENTION DEVICE FOR VEHICLES

Our invention relates to an injury prevention device for vehicles and more particularly to such a device which prevents a person within a moving vehicle from contacting hard surfaces when the vehicle is quickly decelerated through normal braking action or impact.

To eliminate impact injuries, the interiors of modern vehicles are upholstered. In addition to enhancing the aesthetic appearance, such upholstery softens the impacting force felt by a person when the vehicle suddenly changes its speed. The contact pressure on the person's body should never be such to cause local (facial) injury. The effectiveness of such padding and upholstery is restricted in the ordinary vehicle because of space limitations which do not allow the padding to be of the desirable thickness of several inches. Further, some structures in the vehicle, such as windows, are inherently not suitable for upholstering.

An object of the present invention is to provide an injury prevention device for vehicles which is reliable in operation.

Another object of the present invention is to provide such a device which is relatively compact when not actuated to minimize the storage area required within the vehicle.

Still another object of the present invention is to provide such a device which is readily attachable to be placed on any hard surface within the vehicle.

Yet another object of the present invention is to provide such a device which almost instantaneously responds to sharp changes in the speed of the vehicle.

Another object of the present invention is to provide such a device which is relatively inexpensive yet attractive and free from inadvertent operation.

Other objects, advantages, and features of the present invention will become more apparent from the following description.

According to our invention, suitable cushioning and shock-absorbent materials, such as sponge plastics, are compressed to approximately 10 percent of their bulk and carried in the vehicle in suitable pressure tanks under a gas pressure of about 20 atmospheres. In an accident, such pressure tanks are opened responsive to the braking or deceleration of the vehicle or from contact with an obstacle. The gas pressure thereupon expands the cushioning material within a few thousandths of a second to its original size before it was compressed into the pressure tank.

In practice, the pressure tanks containing the compressed padding are mounted inside the vehicle in such a manner that the inflated pad or pads prevent impact between a person in the vehicle and the vehicular structure which is a frequent cause of injuries. The compressed pads are best located over the instrument fittings, the top of the steering post and wheel, the top edges of the front and rear back rests, beneath the roof frame and adjacent to the doors or side walls below the windows.

For a fuller understanding of the nature and objects of the invention, reference should be had to the following detailed description taken in connection with the accompanying drawings, in which.

Figure 1:
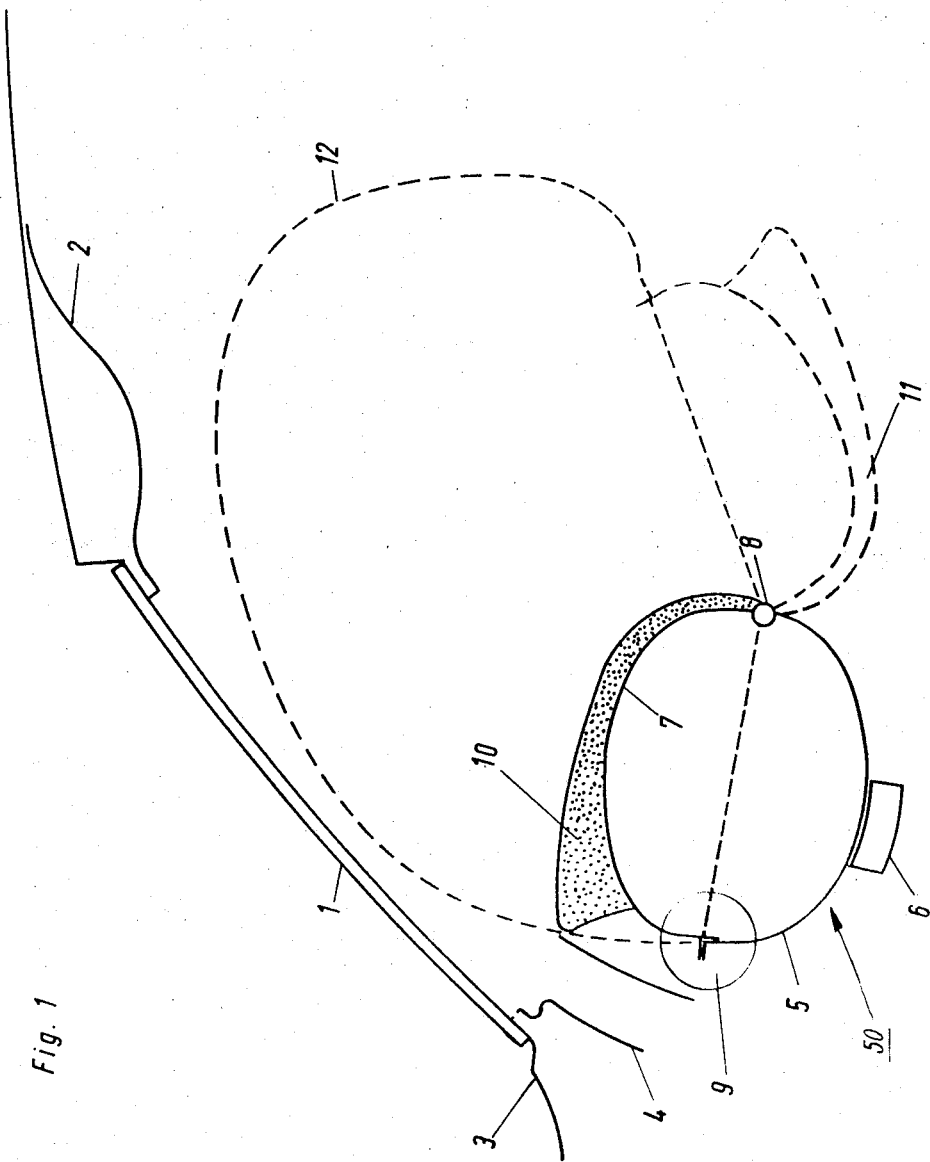
FIG. 1 is a longitudinal sectional view through a portion of the front of a vehicle illustrating an embodiment of the present invention.

FIG. 1 shows a longitudinal section through part of a vehicle with a built-in crash pad of the present invention. The windshield is denoted by 1, the top roof 2, the bottom of the windshield frame by 3, and the defroster nozzle by 4. The instrument equipment panel is covered by a two-piece or shell pressure tank or housing 50 approximately cylindrical in shape. Lower shell 5 is firmly connected to the chassis of the vehicle through member 6. Upper shell 7 is joined to the lower shell 5 on the one side by a hinge 8 and on the other side by a closure 9, to be described later. The two-piece shell carries a crash pad 10 on the outside in the usual manner. Responsive to a predetermined amount of deceleration of the vehicle or on contact of the vehicle against external sensors, closure 9 opens up. Internal pressure causes the top shell 7 to pivot about the hinge 8 and assume the position 11 shown by the broken line. The foam material then expands under the action of the compressed gas (nitrogen, for example) and approximately assumes the shape 12. The top shell 7 in the open position 11 is soft enough to absorb impact energy from the body of the passenger preventing injuries. In this manner, the passenger is prevented from moving against any hard surfaces, and injury is thus prevented.

Figure 2:
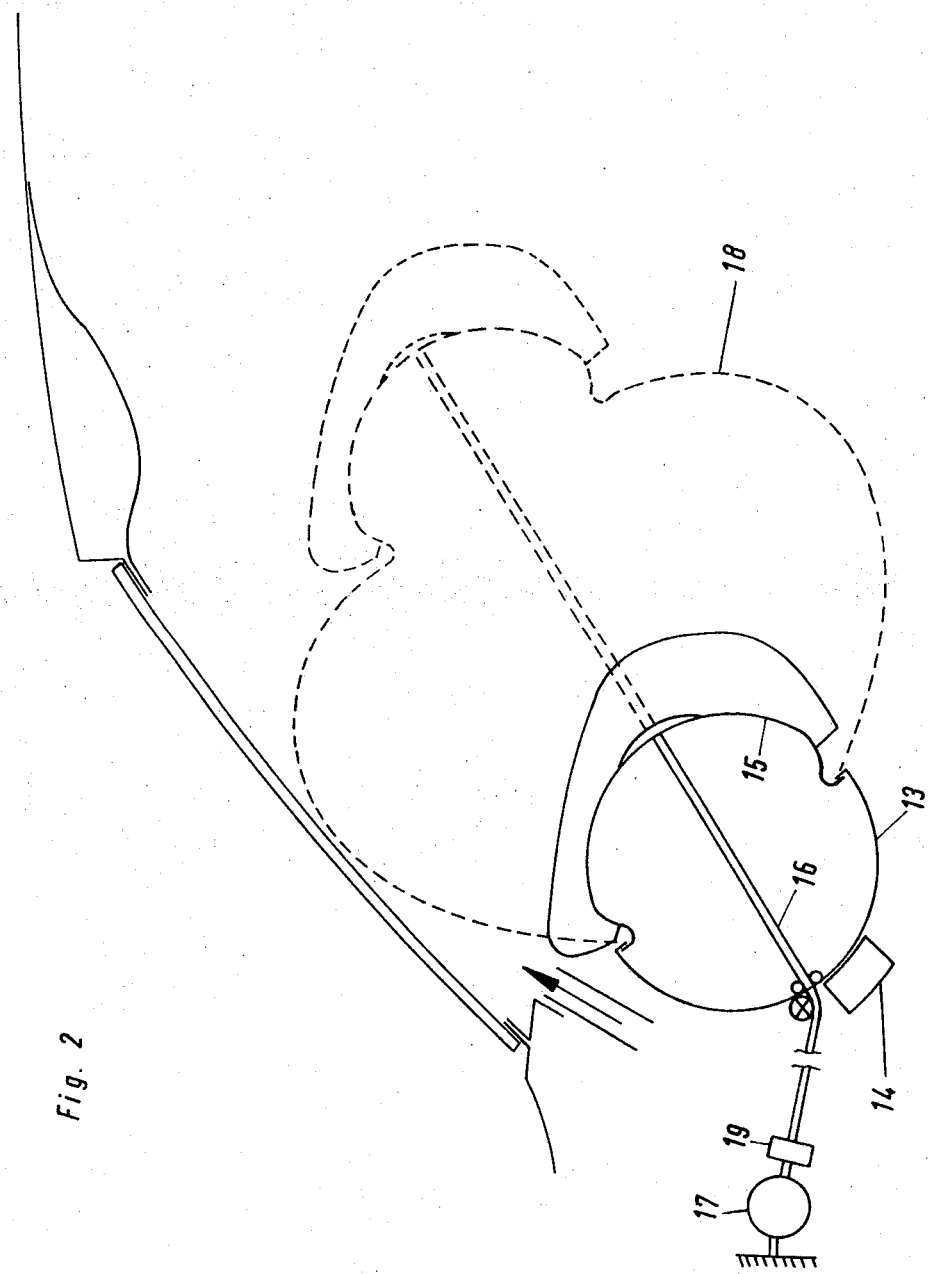
FIG. 2 is another embodiment of the present invention.

FIG. 2 shows another embodiment of the invention. The bottom shell of the pressure tank 13 is joined to the chassis member 14. The top shell 15 is supported on the lower shell 13 by means of connection 16. When the vehicle decelerates a predetermined amount, a tripping device 17 releases the connection 16, whereupon the internal pressure of the tank inflates the top shell 15 and allows the compressed padding to expand. It then takes on the shape 18 shown in broken line. The tank lid or top shell 15 can then shift only so far from the lower shell as is permitted by a stop means 19 fitted on the connection 16. The lid 15 is padded at its top in the usual manner.

Figure 3:
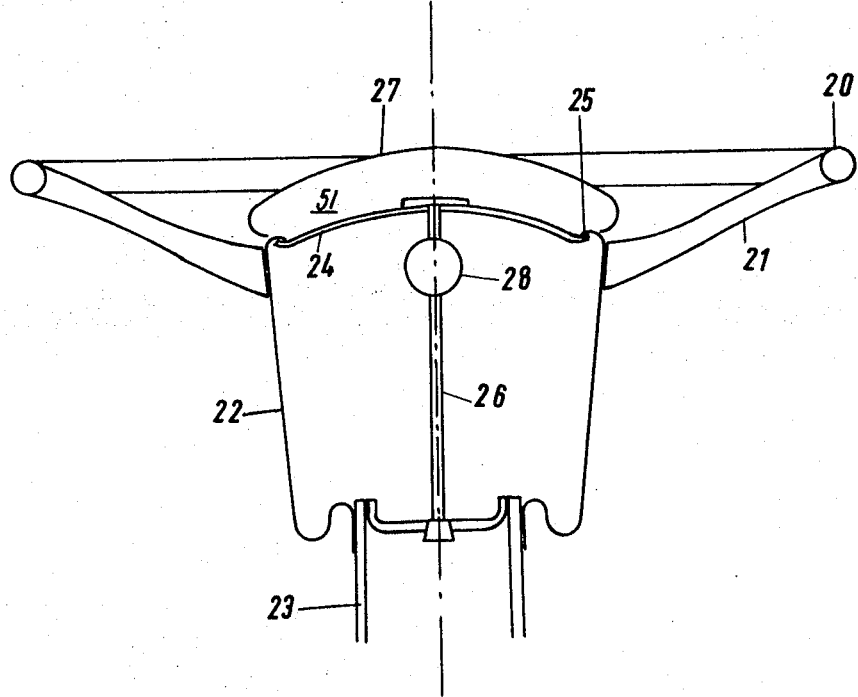
FIGS. 3 and 4 illustrate an embodiment of the present invention for use on a steering wheel of an automobile.
Figure 4:
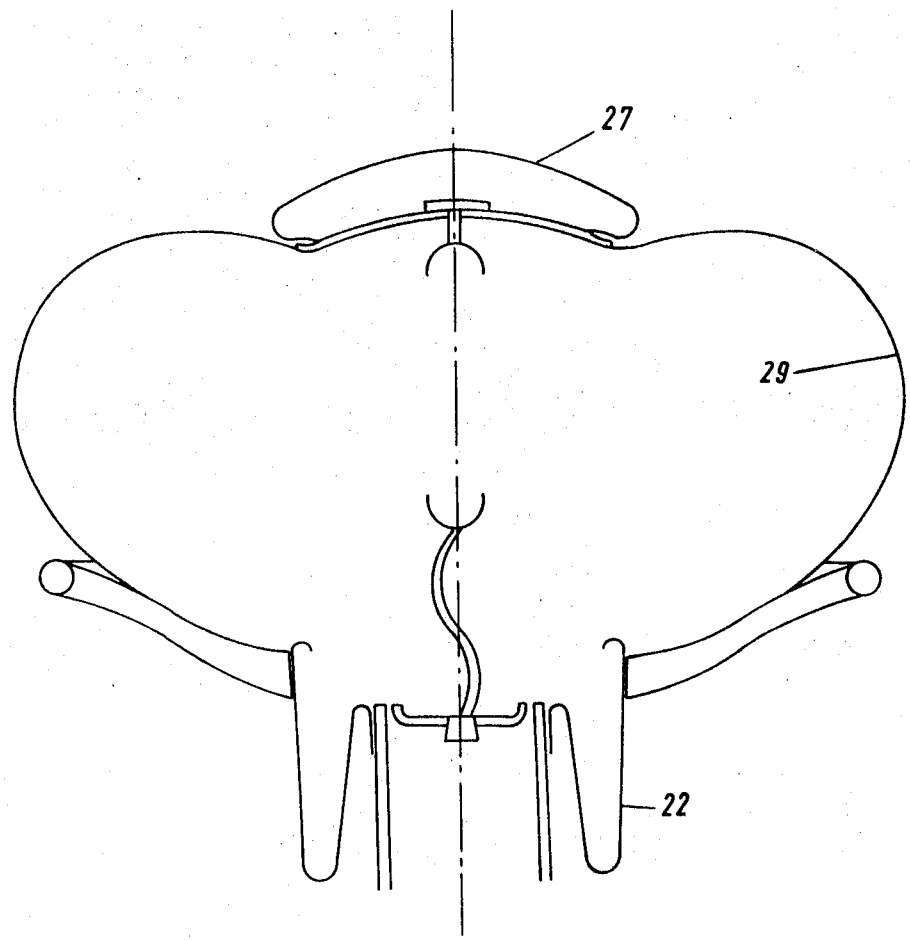

FIGS. 3 and 4 show a similar type of embodiment for the steering wheel of an automobile. The steering wheel rim 20 is supported on spokes 21 and the top 22 of the steering post 23. The top 22 houses the compressed padding material 51 under pressure. It is closed on top by a cover 24 held fast by a groove 25 and a a fastening 26. Padding 27 is carried on top of the compressed material 51. In case of an accident, a separator 28 breaks the fastening and the compressed padding expands to the shape shown in FIG. 4. FIG. 4 shows the configuration of the padding after the accident. Injury to the driver is prevented by the expanded padding 29 and padding 27 which are shock-absorbant preventing the driver from contacting the hard steering wheel or post.

Figure 5:
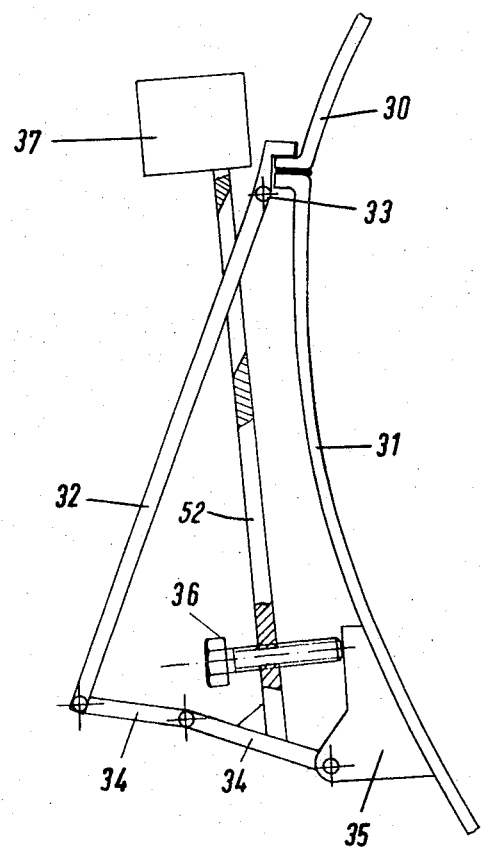
FIG. 5 is a detailed view of an embodiment of an actuation device for use with the present invention.

FIG. 5 is a detailed view of one embodiment of an actuation means or closure 9 of FIG. 1. The top shell of the pressure tank is denoted by 30, and the bottom shell by 31. In the initial position, the tank halves are held by a lever 32 fulcrumed at a point 33 on the bottom shell. Lever 32 bears against a block 35 fastened to the bottom shell 31 of the tank through the action of an articulated lever 34. The articulated lever 34 can be adjusted toward dead center by a screw 36 attached to a vertical member 52 of the articulated lever 34. The vertical member 52 of articulated lever 34 also carries a weighted block 37. When the deceleration of the vehicle exceeds a predetermined value, block 37 moves forward (leftward) and presses the articulated lever 34 past dead center. Thereupon, the lever 32 releases the rim of the top shell 30.

Figure 6:
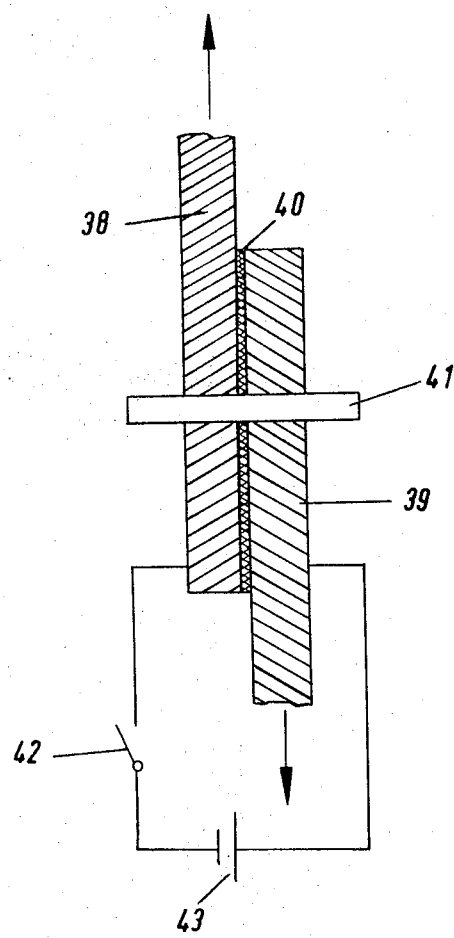
FIG. 6 is a detailed view of another embodiment of an actuation means for use with the present invention.

FIG. 6 is a detailed view of an embodiment of a tripping or actuation device 17 of FIG. 2 or 28 of FIG. 3. Metal conductor parts 38 and 39 are mutually insulated by a thin separator film or sheet 40 and are interconnected by a shear pin 41. Parts 38 and 39 are connected to respective ones of the two shells. The vehicle battery 43 is connected across parts 38 and 39 through a switch 42. In this configuration the largest resistance in the path occurs in shear pin 41. When switch 42 is closed through a deceleration, the shear pin is heated breaking the separator connection 40 between parts 38 and 39, allowing current to flow through the electrical path.

The pad may be attached to any portion of the interior of the vehicle or may also be attached to the exterior thereof. As an example, the crash pad can be attached to the instrument panel and steering wheel and also to the roof. The injury prevention device of the present invention is capable of being manufactured relatively inexpensively and is prevented from inadvertent operation through the use of the above described actuation means in FIGS. 5 and 6.

The crash pad may be provided with a top surface which is wholly or partially impermeable to a gas and may include open pores which come into contact with the person in the vehicle. In addition, closed pores and a gas-tight layer may be located beneath the top open-pored surface. Further, and as an alternative embodiment, the top surface may be provided with closed pores and open pores are included in the interior of the crash pad. The arrangements described above with regard to the open or closed pores for the surfaces of the crash pad further serve to absorb shock and prevent injury to a person in the vehicle.

It will thus be seen that the objects set forth above, among those made apparent from the preceding description, are efficiently attained and, since certain changes may be made in the above article without departing from the scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. We claim:

1. An injury prevention device for vehicles comprising a container on the vehicle, said container having a cover, a substantially unitary body of expansible foam formed as a cushion of foam material maintained in a compressed condition inside said container under a constant high gas pressure, and actuation means being tripped responsive to the speed of said vehicle to open said cover to thereby release said compressed cushion of foam material allowing the latter to rapidly expand to its natural state while still in the form of a substantially unitary body to prevent a person from contacting hard surfaces within the vehicle.

2. An injury prevention device for vehicles as set forth in claim 1, wherein the container comprises two shells, one of which includes said cover, hinged together on one side and held together on the other side by a said actuation means.

3. An injury prevention device for vehicles as set forth in claim 2, wherein one of said two shells moves towards said person when said actuating means is tripped.

4. An injury prevention device for vehicles as set forth in claim 2, wherein said actuation means comprises a metal conductor connected to a respective one of said two shells, an insulating layer connected between said two shells connecting said two shells together, and an electrically conducting shearing pin connected through said layer and between said metal conductors, a source of power and a switch connected between said source of power and one of said metal conductors, said switch being normally open being closed responsive to the speed of said vehicle, said pin being heating when said switch is closed causing said layer to break allowing said shells to separate.

5. An injury prevention device for vehicles as set forth in Claim 1, wherein one shell of said two shells of the container is connected to the other by a groove and fastening, said groove and fastening allowing said two shells to separate responsive to the speed of said vehicle and enabling said padding material to inflate.

6. An injury prevention device for vehicles as set forth in Claim 1, wherein a portion of said vehicle is formed as said container.

7. An injury prevention device for vehicles as set forth in Claim 1, wherein said cushion of foam material comprises a volume of self-contained foam plastic, said foam plastic extending to the outer surface of said cushion to contact said person upon expansion thereof.

8. An injury prevention device for vehicles as set forth in Claim 1, wherein the surface of said cushion of foam is impermeable to gas.

9. An injury prevention device for vehicles as set forth in Claim 1, wherein the surface of said cushion of foam coming into contact with the person includes open pores.

10. An injury prevention device for vehicles as set forth in Claim 9, wherein enclosed pores and a gas-tight layer are beneath said open-pored surface.

11. An injury prevention device for vehicles as set forth in claim 1, wherein said cushion of foam is provided with closed pores near the top surface and open pores in the interior of the pad.

12. An injury prevention device for vehicles comprising a container, an inflatable pad including inflatable padding material maintained in a normally compressed condition inside said container under a constant high pressure, and actuation means being tripped responsive to the speed of said vehicle and rapidly inflating said pad to prevent a person from contacting hard surfaces within the vehicle, wherein said actuation means comprising a lever, an articulated lever connected to said lever, and a weighted block connected to said articulated lever, and being moved responsive to the speed of said vehicle to move said articulated lever and said lever causing said two shells to separate.

* * * * *